Dec. 1, 1964     E. W. MANTEUFFEL     3,159,777
DIRECT CURRENT MOTOR
Filed Dec. 15, 1961     3 Sheets-Sheet 1
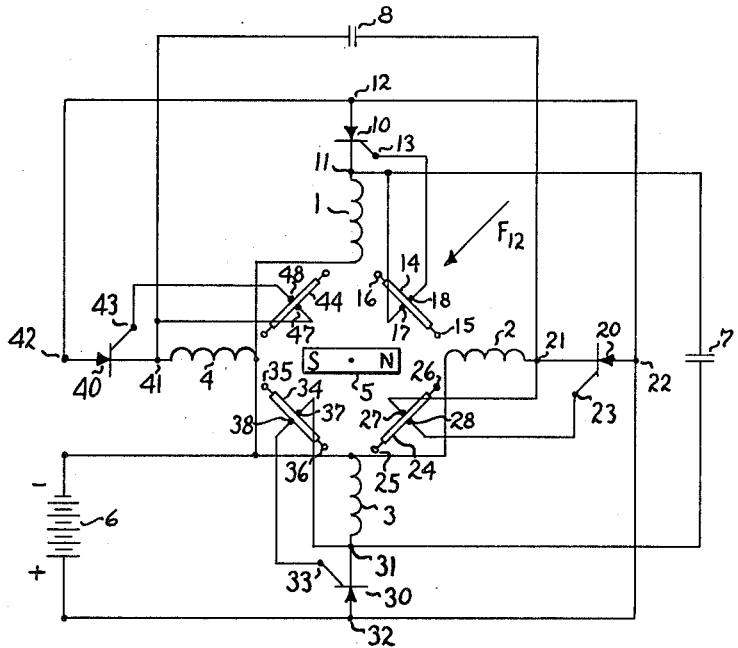
FIG. 1
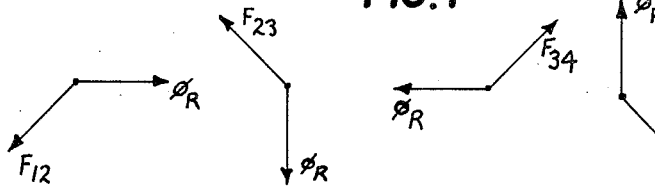
FIG. 2$^a$    FIG. 2$^b$    FIG. 2$^c$    FIG. 2$^d$
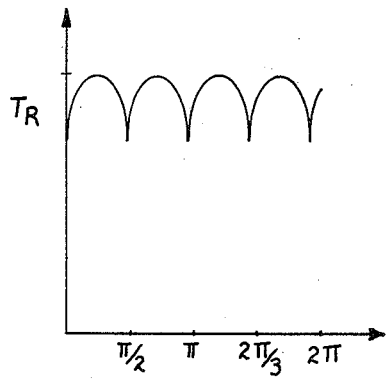
FIG. 3
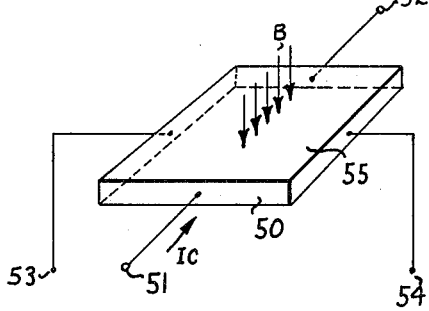
FIG. 4
INVENTOR.
ERICH W. MANTEUFFEL
BY Robert H Montgomery
ATTORNEY

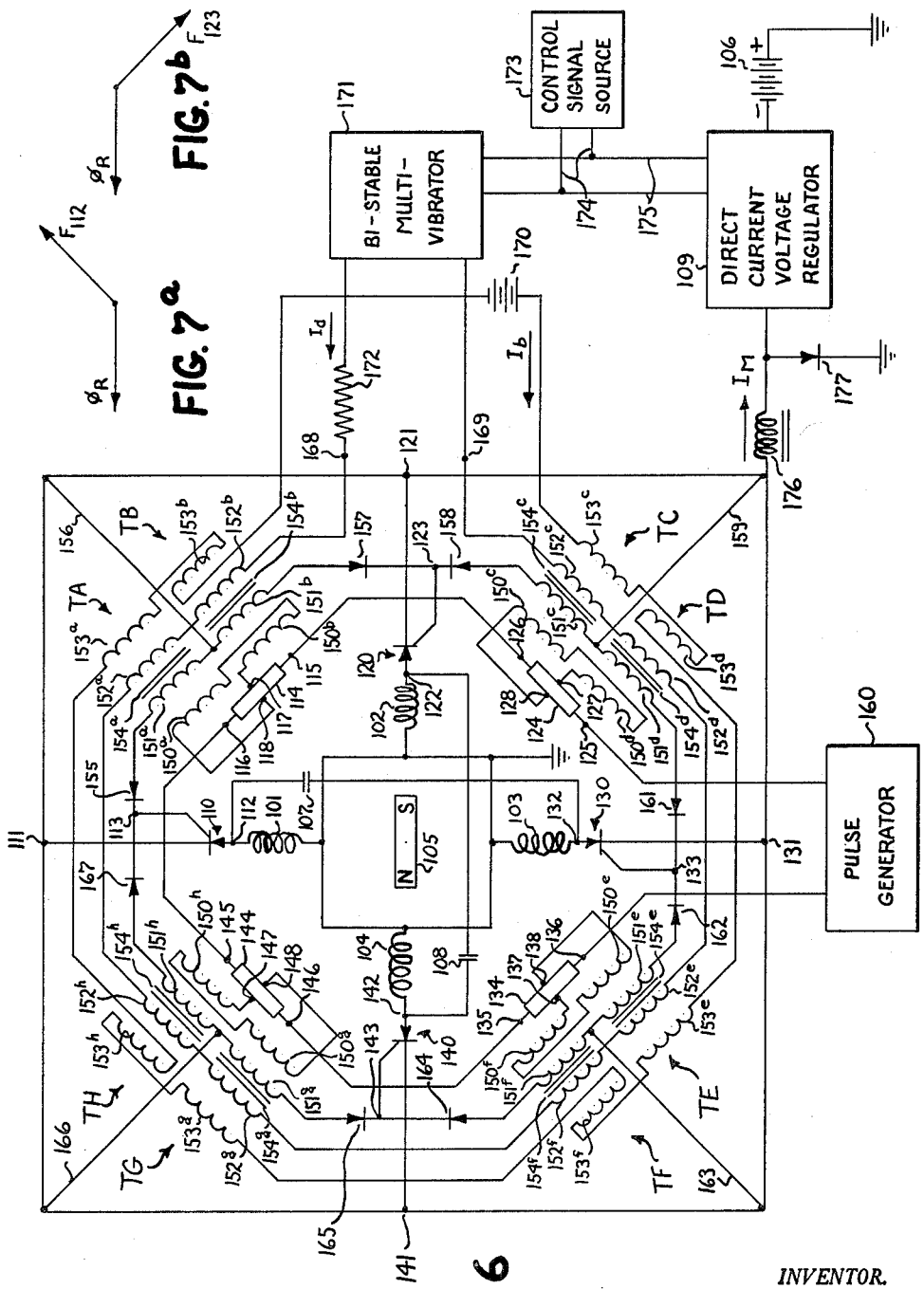

United States Patent Office 3,159,777
Patented Dec. 1, 1964

3,159,777
DIRECT CURRENT MOTOR
Erich W. Manteuffel, Ithaca, N.Y., assignor to General
Electric Company, a corporation of New York
Filed Dec. 15, 1961, Ser. No. 159,539
12 Claims. (Cl. 318—138)

This invention relates to electric motors, and more particularly relates to a motor adapted to be energized from a direct current source which requires no mechanical commutator.

Conventional direct current motors require mechanical commutators to supply current to motor armature windings, and while these commutators generally perform this designed function, their use presents features and/or problems which it would be desirable to eliminate, such as refinishing of commutator wearing surfaces, possible arcing between brushes and commutator segments, and arcing between commutator segments which may result from abrupt interruption of current in the armature windings and periodic brush replacement.

It would be desirable to have a direct current motor which has no mechanical commutator or current collector and thus avoid the problems associated with such commutators or collectors. Moreover, some applications and/or environments detrimentally contribute to the efficient operation of carbon brushes. In such applications, a commutatorless direct current motor would be most attractive.

The advent of thyratrons raised hopes of providing a direct current motor without a mechanical commutator. A variety of circuits for achieving a commutatorless motor utilizing thyratrons have been proposed which eliminate the actual power commutator, but which require a small auxiliary commutator. For example, see C. H. Willis, "A Study of the Thyratron Commutator Motor" The General Electric Review 1933, volume 36, pp. 76–80. In such circuits, the auxiliary commutator has the function of causing the thyratrons to fire in proper sequence with regard to the rotor position, and thus to energize the armature windings which are positioned in the stator housing to produce a driving torque on the rotor. Although such motors and circuits therefor were proposed or constructed, they did not find industry acceptance or create a demand therefor, primarily, it is believed, because of non-reliability of the components involved, the short life of the components, and difficulty in obtaining proper firing sequence of the thyratrons.

It is accordingly an object of this invention to provide a direct current motor having no mechanical commutator in which one or more windings are sequentially energized in a new and improved manner to produce a driving torque on the rotor member of the motor.

It is a further object of the invention to provide an improved direct current motor having no mechanical commutator in which a plurality of windings are sequentially and intermittently energized though solid state controlled rectifying devices to produce a driving torque on the rotor member of the motor.

It is another object of the invention to provide a new and improved direct current motor without a mechanical commutator in which a plurality of windings are sequentially energized through solid state controlled rectifiers to produce a driving torque on the rotor member of the motor, with the solid state controlled rectifiers being directly triggered by Hall effect generators which sense the position of the rotor member.

It is still another object of this invention to provide an improved direct current motor having no mechanical commutator with facility for reversal and speed regulation.

Briefly stated, the invention in one form thereof, comprises a direct current motor having a rotor member with a permanent magnet thereon and flux-producing windings positioned within the motor stator. Each of the windings is connected through a respective controllable unidirectional conducting device, such as a silicon controlled rectifier, to a source of unidirectional potential. A plurality of Hall effect generator elements are also positioned in a predetermined magnetic relation with the rotor member. Each of the Hall effect generator elements has input and output terminals and is energized through its input terminals by a suitable pulsed current signal. Coincident interaction of magnetic flux from a permanent magnet rotor member and the current pulses produces an output signal at the output terminals of the Hall effect elements. The invention provides for generation of output signals of the Hall effect generators of sufficient magnitude to gate the controllable unidirectional conducting devices without intermediate means of amplification to thereby render the controlled rectifiers conductive in such a manner as to sequentially energize flux-producing windings in the stator member and produce a driving torque on the rotor member. An important feature of the invention is the application of current pulses to the Hall effect generators of such magnitude and time durations as to obviate amplification of the output signal of the Hall effect generators.

At this point the contribution to the art of Albert Hansen is acknowledged. In U.S. Patent 2,512,325, assigned to the same assignee as the present invention, Albert Hansen broadly discloses and claims a commutatorless motor using a Hall effect device to sense motor shaft position and control the conduction of vacuum tubes in circuit with flux-producing windings.

The present invention, while generally utilizing the teachings of the aforementioned patent in regard to the broad use of Hall generators as shaft position sensing elements, provides for direct firing control of the gating elements in the stator winding circuit, improved firing means, speed control, reversing means and enables use of commutatorless direct current motors of high horsepower.

The features of the invention which are believed to be novel are pointed out with particularity in the claims appended to and forming part of this specification. However, it is believed that the invention may be best appreciated by reference to the following description taken in conjunction with the drawings, wherein:

FIGURE 1 schematically illustrates a motor embodying the invention;

FIGURES 2a, 2b, 2c and 2d illustrate the angular relation between the rotor flux and the armature field of the motor of FIG. 1 for various angular rotor positions;

FIGURE 3 graphically illustrates the torque produced on the rotor, with respect to rotor position, of the motor of FIG. 1;

FIGURE 4 is illustrative of a Hall effect generator;

Figure 8:
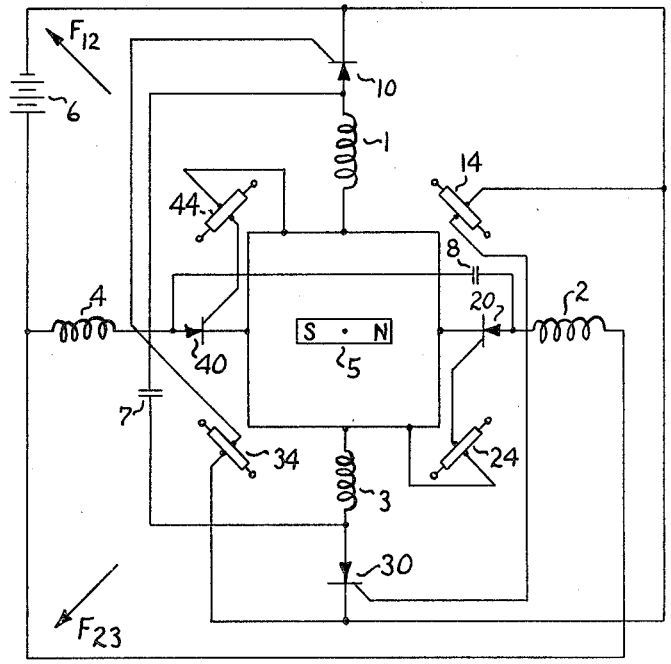

FIGURE 6 schematically and partially in block illustrates a motor embodying the invention with provision for direction control and speed regulation;

FIGURES 7a and 7b illustrate the angular relationship of rotor flux and armature field of the motor of FIG. 6; and FIGURE 8 illustrates another embodiment of the invention.

Reference is now made to FIG. 1, which shows a direct current motor which, in accordance with the invention, requires no mechanical commutator. FIG. 1 schematically illustrates a motor which comprises four magnetic flux-producing windings 1, 2, 3 and 4 arranged on pole members, not shown, which are positioned in normally symmetrically spaced relation within a motor magnet frame member, not shown. A permanent magnet rotor member 5 illustrated as a bar magnet providing north (N) and south (S) poles is mounted on the motor shaft, not shown. The rotor member 5 could also be a cylindrical permanent magnet rotor or a dumbbell-shaped permanent magnet rotor mounted on the motor shaft. Each of the windings 1, 2, 3 and 4 has one terminal thereof connected to the negative terminal of a source of unidirectional potential 6 illustrated as a battery. The other terminals of the windings 1, 2, 3 and 4 are connected to the positive terminal of the source 6 through solid state switching devices shown as controlled rectifiers 10, 20, 30 and 40 respectively. Commutating capacitors 7 and 8 are connected between the cathodes of controlled rectifiers 10 and 30 and 20 and 40, as hereinafter explained. The switching devices are preferably silicon controlled rectifiers, but may be any suitable semi-conductive switching device. Each of the controlled rectifiers 10, 20, 30 and 40 comprises cathode, anode and gate electrodes as schematically illustrated, and has a cathode electrode terminal 11, 21, 31 and 41 respectively, an anode electrode terminal 12, 22, 32 and 42 respectively and a gate electrode terminal 13, 23, 33 and 43 respectively. The cathode electrode terminals 11, 21, 31 and 41 are connected to one terminal of the windings 1, 2, 3 and 4 respectively and the anode electrode terminals 12, 22, 32 and 42 are connected to the positive terminal of source 6. When one of the controlled recifiers 10, 20, 30 and 40 is rendered conductive, current will flow from the positive terminal of source 6 through the winding connected to the controlled rectifier and return to the negative terminal of source 6.

The motor also includes four solid state magnetic sensory elements 14, 24, 34 and 44, which are Hall effect generators, each arranged to control the firing of an associated rectifier and positioned in magnetic flux-sensing relation with permanent magnet rotor member 5 or an auxiliary permanent magnet motor, as hereinafter explained. In FIG. 1 each Hall effect generator is displaced 45 electrical degrees clockwise from its associated flux-producing winding. For example, an output signal from Hall effect generator 14 is applied across electrode terminals 11 and 13 of rectifier 10. Each of the Hall generators 14, 24, 34 and 44 has input excitation terminals 15, 16; 25, 26; 35, 36; and 45, 46 respectively, and output terminals 17, 18; 27, 28; 37, 38; and 47, 48 respectively. The output terminals 17, 18 of Hall generator 14 are connected across the cathode electrode and gate electrode terminals 11 and 13 of controlled rectifier 10. The output terminals 27, 28 of Hall generator 24 are connected across the cathode electrode and gate electrode terminals 21 and 23 of controlled rectifier 20. The output terminals 37, 38 of Hall generator 34 are connected across cathode electrode and gate electrode terminals 31 and 33 of controlled rectifier 30. The output terminals 47, 48 of Hall generator 44 are connected across cathode electrode and gate electrode terminals 41 and 43 of controlled rectifier 40. Commutating capacitor 7 is connected across cathode terminals 11 and 31 and commutating capacitor 8 is connected across cathode terminals 21 and 41. The input terminals of Hall effect generators 14, 24, 34 and 44 are supplied with repetitive pulse excitation current from a suitable source, hereinafter exemplified.

The operation of the motor is as follows: Assume that the rotor member 5 is in the position shown in FIG. 1 and the distribution angle of flux emanating from rotor 5 is 45° on either side of the magnetic axis of rotor 5. From the coincident interaction within Hall generators 14 and 24 of magnetic flux $\phi_R$, FIG. 2, from the north pole (N) of the rotor member 5 and pulsed energizing current applied to input terminals 15 and 16 of Hall generator 14 and input terminals 25 and 26 of Hall generator 24, from a pulse source, not shown in FIG. 1, positive going gating signals will be generated within the Hall generators 14 and 24 and output voltages will appear across output terminals 17, 18 and 27, 28 which are applied to the gate electrode 13 and 23 of controlled rectifiers 10 and 20 respectively. These gate signals will fire controlled rectifiers 10 and 20 and unidirectional current will flow from the source 6 through the windings 1 and 2, establishing a resultant armature field $F_{12}$.

FIG. 2a shows the angular relation between the armature field $F_{12}$ and the rotor flux $\phi_R$. The interaction of the armature field $F_{12}$ and the rotor member flux $\phi_R$ produces a clockwise torque on the rotor member causing it to rotate in a clockwise direction. When the rotor member 5 has rotated clockwise 90°, Hall generator 34 will come under the influence of the north pole of rotor member 5 and a coincident current pulse applied to terminals 35, 36 and will cause Hall effect generator 34 to apply a positive gating signal to gate electrode 33 of controlled rectifier 30. This gating signal will trigger controlled rectifier 30 into conduction and unidirectional current will then flow from source 6 through winding 3. When rectifier 10 became conductive, commutating capacitor 7 was charged through rectifier 10 by direct current source 6. At the instant controlled rectifier 30 is triggered into conduction, commutating capacitor 7, which is connected between cathode 31 of controlled rectifier 30 and cathode 11 of controlled rectifier 10, will become short-circuited through windings 1 and 2 and their common connection and discharge therethrough and extinguish controlled rectifier 10.

The angular relation between armature field $F_{23}$, that is, the armature field established when unidirectional current is flowing through windings 2 and 3, and rotor flux $\phi_R$ is shown in FIG. 2b. The action of this armature field $F_{23}$ on the rotor member 5 will result in continued clockwise torque on rotor member 5.

In a like manner, when rotor member 5 has rotated through another 90° clockwise, Hall generator 44 will trigger controlled rectifier 40 into conduction, commutating capacitor 8 will extinguish controlled rectifier 20, and armature field $F_{34}$ will exert a clockwise torque on rotor member 5. A subsequent 90° clockwise rotation will result in Hall generator 14 triggering controlled rectifier 10 into conduction, commutating capacitor 7 extinguishing controlled rectifier 30, and armature field $F_{41}$ exerting a continuing clockwise torque on rotor member 5. In this manner, the windings 1, 2, 3 and 4 are sequentially energized to produce a driving clockwise torque on rotor member 5.

The instantaneous magnitude of this clockwise torque may be given by the expression $$T_R = \sqrt{2}\, KIN\, \phi_R \sin \theta$$

where $T_R$ = driving torque acting on the rotor member 5
$K$ = a constant
$I$ = the current flowing in the windings
$N$ = the number of turns of each flux producing winding
$\phi_R$ = the magnitude of the rotor flux from the permanent magnet rotor 5
$\theta$ = the instantaneous angular displacement between the resultant armature flux and the rotor flux $\phi_R$ The value of $\theta$ changes from 135° at a time when a winding begins conducting unidirectional current to 45° at a time immediately before a subsequent winding begins conducting unidirectional current, at which time the value of $\theta$ abruptly returns to 135°. Thus, the above expression shows that the instantaneous torque on the rotor member 5 varies from .707 $T_R$ max. for each 90° of rotation of the rotor member 5, with the maximum instantaneous torque acting on the rotor member 5, when rotor member 5 is normal to the direction of the armature field. The graphical relation of the instantaneous torque $T_R$ on the rotor and the angular rotor position is shown in FIG. 3.

FIG. 4 illustrates in simplified form a Hall effect generator. The device comprises a slab 50 of a material such as indium antimonide or indium arsenide having input terminals 51 and 52 electrically connected to the ends thereof. The device operates on the Hall effect principle which is known to those skilled in the art. If a magnetic field of flux density B is applied perpendicular to the face 55 of slab 50, and an energizing control current $I_C$ is applied between input terminals 51 and 52, an output voltage is developed between output terminals 53 and 54. The reason that the output voltage is developed is that the magnetic field deflects the charge carriers moving between input terminals 51 and 52, building up a positive charge at output terminal 53 and a negative charge at output 54. This output voltage is called the Hall voltage and is equal to $$V_H = R_h \frac{I_c B}{d}$$

where $V_H$=Hall voltage
$R_h$=Hall constant
$I_c$=Applied energizing current
$B$=Flux density of magnetic field applied
$d$=Thickness of slab 50

For an applied magnetic field of 10,000 gauss and a maximum rated D.C. applied control current of 500 milliamps, the Hall voltage delivered by present commercially available Hall generators is approximately 300 to 500 millivolts, depending upon the thickness of the slab used in the generator. Present commercially available silicon controlled rectifiers require a threshold gate to cathode voltage of about 3 volts to assure successful triggering of the controlled rectifier into conduction. However, this gate voltage must exist for the duration only of a few microseconds in order to fire the controlled rectifier.

In accordance with the invention, the Hall generators are supplied with an energizing current which comprises a series of repetitive pulse currents of relatively large magnitude and extremely short time duration. Motors utilizing the invention have been operated satisfactorily with pulse durations of 5 microseconds. The magnitude of the current pulse is so chosen in conjunction with the applied magnetic field that the voltage output of the Hall generator is of sufficient magnitude to fire the controlled rectifiers. When the rotor field penetrates one of the Hall generators and sufficiently coincides in time with a current pulse applied to the input terminals of the Hall effect generator, one current pulse will then be sufficient to cause firing of the associated controlled rectifier and the succeeding current pulses will have no effect on the controlled rectifier. The repetitive pulse excitation of the Hall effect generators avoids the necessity of supplying a large continuous current thereto and therefore avoids the necessity of a large source of power, and also avoids overloading and resultant overheating of the Hall effect generators.

A motor having four armature windings and a two-pole rotor, has been operated at 6000 revolutions per minute (r.p.m.) at a pulse repetition rate of 800 pulses per second (p.p.s.). Thus, there were only 8 pulses per motor revolution at that speed. With the motor operated at 6000 r.p.m. and the pulse repetition rate 1200 p.p.s. there was no observable difference in operation. This indicated that the rotor adjusts itself during rotation in conformance with torque applied thereto in such a manner that pulses will be furnished to the gating electrodes of the controlled rectifiers at a time when the magnetic flux emanating from the rotor and directed toward a particular Hall effect generator exceeds a predetermined threshold level of flux density which in conjunction with an applied current pulse will produce a Hall effect generator output voltage sufficient to gate an associated controlled rectifier. In the configuration of FIG. 1, it is preferable to utilize an auxiliary permanent magnet rotor having the predetermined threshold level of flux density over an angle of approximately 90°. Then the flux displacement angle on either side of the axis of the poles of the permanent magnet is approximately 45°.

To avoid the possibility of irregularity of operation, it is preferred that the pulse repetition rate, considering pulse width and pulse height, be chosen as high as permissible in view of the tolerable heating of the Hall effect elements.

For simplicity of disclosure in the circuit of FIG. 1, the Hall effect generators 14, 24, 34 and 44 were described as being positioned within the motor air gap; however, it is preferred to mount a small auxiliary permanent magnet rotor on a motor shaft extension and operatively position the Hall effect generators thereabout. In one arrangement, the Hall effect generators have been cemented inside of a circular ring of iron punchings in predetermined positions and the ring inserted into a supporting ring of non-magnetic material which was secured to the motor housing coaxially with the shaft extension carrying the auxiliary permanent magnet rotor. The magnetic ring was rotatable within the supporting ring. Proper adjustment of the Hall element carrying ring could then be made to obtain equal speed-torque characteristics for both directions of rotation of the motor shaft. In FIG. 1, where only four Hall elements are employed for either direction of rotation, the only position of the Hall elements which will produce equivalent speed-torque characteristics for both rotational directions is displacement by 45° with respect to the armature windings. If a Hall generator ring, as described above, is turned against the direction of rotation (counterclockwise, FIG. 1), the air gap flux of the motor will be weakened, resulting in increased speed. This same relation is true if one shifts the brushes of a conventional D.C. motor against its sense of rotation. Turning the Hall elements in the other direction will have the opposite effect on motor speed; therefore, if equality of speed-torque characteristics for both directions of rotation is required, the angle of displacement between the Hall elements and flux-producing windings should be 45°.

In a motor with four Hall elements, as disclosed in FIG. 1, the angular distribution of flux emanating from the permanent magnet should be about 45° on either side of the axis of the magnet in order to operate the motor in both directions under conditions of maximum available average torque. If the angle of distribution should be, for example 60°, then controlled rectifier 30 would be fired from Hall element 34 after the rotor 5 had rotated 75° instead of 90°, and the angle between $\phi_R$ and $F_{23}$ (FIG. 2b) would become 150°, resulting in less average torque. In order to correct for this deficiency in torque, the angles between flux-producing windings and associated Hall elements would then have to be increased also to 60° by turning the Hall element ring 15° in the direction of rotation.

It is thus apparent for the motor of FIG. 1 that the flux distribution angle with respect to the axis of the rotor should be approximately 45°. Of course, the flux distribution angle of the rotor will be selected in accordance with the number of main poles and number of poles on the rotor.

Figure 5:
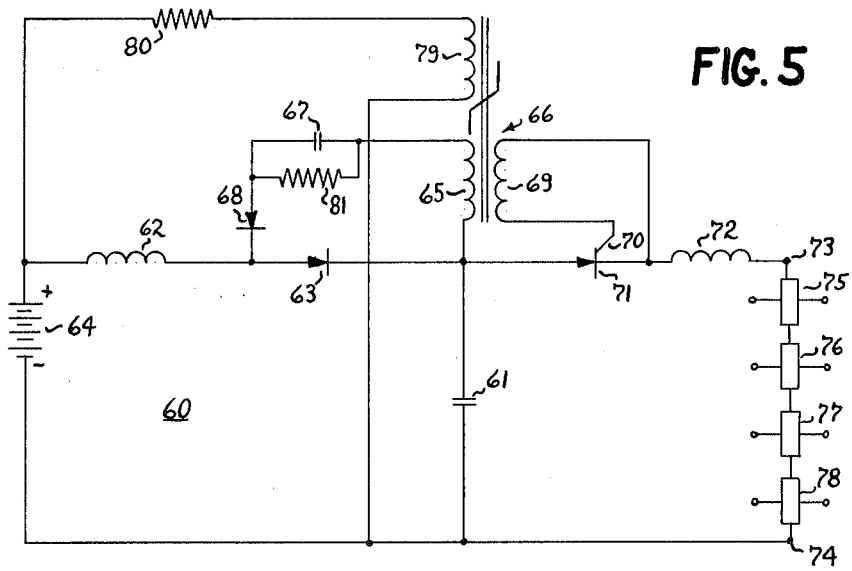
FIGURE 5 illustrates schematically a pulse generator which may be used to energize Hall effect generators utilized in the invention.

FIG. 5 illustrates the circuit diagram of a suitable pulse generator 60 which may be used to supply the repetitive pulse current of relatively large magnitude and extremely short duration to the input terminals of the Hall generators, although, of course, any suitable pulse generator which would supply such an energizing current could be used with the invention. This circuit and its operation is as follows: Capacitor 61 is charged through inductance 62 and diode 63 from a unidirectional potential source 64. As is known to those skilled in the art, capacitor 61 will charge to a voltage equal to approximately twice the value of the voltage of source 64 in a time determined by the square root of the product of the capacitance and inductance of capacitance 61 and inductance 62, respectively.

When the charging current becomes zero, the capacitor 61 will attempt to discharge back through inductance 62. However, diode 63 blocks such a discharge current flow and capacitor 61 starts to discharge through primary winding 65 of pulse transformer 66, capacitor 67 and diode 68 and then through inductance 62 to source 64. This discharge through primary winding 65 causes a pulse of short duration to appear in secondary winding 69 of pulse transformer 66, which is applied to gate electrode 70 of controlled rectifier 71 and triggers controlled rectifier 71 into conduction. Capacitor 61 then discharges through inductance 72 and reproduces a pulse output in a load connected across terminals 73 and 74. A series circuit of Hall generators 75, 76, 77 and 78 is illustrated as connected across terminals 73 and 74. The output terminals 73 and 74 of the pulse generator could also be applied to the primary of a pulse transformer having individual secondary windings each connected to the input terminals of one of the Hall effect generators. The described operation is of course repetitive. The time duration and peak magnitude of the applied pulses may be controlled by controlling the value of inductance 72. Thus, if the value of inductance 72 is much smaller than the value of inductance 62, a discharge pulse from capacitor 61 of high magnitude and short time duration may be obtained. The pulse repetition frequency of the circuit will be determined primarily by the values of inductance 62 and capacitor 61 and to a lesser extent by the value of inductance 72. If desired, transformer 66 may also have a bias winding 79 thereon, with the magnitude of the current to this winding being controlled by resistor 80. Capacitor 67 is discharged through resistor 81 during interpulse periods.

Thus, current pulses of relatively large magnitudes and quite short durations may be furnished to the Hall generators resulting in a sufficient magnitude of Hall voltage to trigger the associated controlled rectifiers. At the same time, excessive heating effects on the Hall generators are avoided by keeping the value of the applied current at a low average value or low R.M.S. value if the pulse generator is transformer-coupled to the Hall effect generators.

In the motor shown in FIG. 1, a clockwise torque is developed on the rotor member 5 and accordingly the member 5 rotates in a clockwise direction. Torque reversal, and accordingly speed reversal, could be obtained by rotating the Hall generators 90° counterclockwise or by connecting the output of Hall generator 44 to controlled rectifier 10, the output of Hall generator 14 to controlled rectifier 20, the output of Hall generator 24 to controlled rectifier 30, and the output of Hall generator 34 to controlled rectifier 40. However, it is time-consuming and/or may not be practical to physically change the position of elements within the motor or to change electrical connections of the elements FIG. 6 shows an arrangement whereby the direction of rotation of the rotor member may be electrically controlled without making any physical changes in the motor structure, and also illustrates provision for speed regulation of a motor embodying the invention.

For facility of comparison, elements of FIG. 6 similar to elements of FIG. 1 bear the same identifying numerals advanced by 100. The motor of FIG. 6 comprises flux-producing windings 101, 102, 103 and 104 on pole members, not shown, symmetrically spaced on a motor magnet frame member, not shown. The motor shaft, not shown, carries a permanent magnet rotor illustrated as a bar magnet 105 having north (N) and south (S) poles. The windings 101, 102, 103 and 104 are each connected between ground and the negative terminal a direct current voltage source 106 through controlled rectifying devices 110, 120, 130 and 140 having cathode, anode and gate electrode terminals 111, 112, 113; 121, 122, 123; 131, 132, 133; and 141, 142, 143, all respectively. Commutating capacitors 107 and 108 are connected between the anode terminals 112, 132 and 122, 142 of controlled rectifiers 110, 130 and 120, 140 respectively. Where speed regulation of the motor is desired, a direct current voltage regulator 109 may be provided to regulate the voltage applied to the flux-producing windings, and hence the current therethrough, as hereinafter described. Hall effect generators 114, 124, 134 and 144 are positioned in magnetic flux-sensing relation with rotor 105 and have their respective input terminals 115, 116; 125, 126; 135, 136; 145, 146 connected in series and across the output terminals of a pulse generator 160, which may be of the type illustrated in FIG. 5. The output terminals 117, 118; 127, 128; 137, 138; 147, 148 of the respective Hall effect generators are transformer-coupled to the gating electrode terminals 113, 123, 133 and 143 of controlled rectifying devices 110, 120, 130 and 140 respectively.

Operatively associated with each Hall effect generator 110, 120, 130 and 140 is a pair of saturable pulse transformers TA, TB; TC, TD; TE, TF; and TG, TH, respectively. Transformers TA–TH each comprise an input winding 150a–150h, an output winding 151a–151h, a control winding 152a–152h, a bias winding 153a–153h on a saturable magnetic core 154a–154h, all respectively.

Output winding 151a is connected across gate electrode terminal 113 and cathode electrode terminal 111 of controlled rectifier 110 by means of diode 155 and line 156. Output winding 151b is connected across gate electrode terminal 123 and cathode electrode terminal 121 of controlled rectifier 120 by means of diode 157 and line 156. Output winding 151c is connected across gate electrode terminal 123 and cathode electrode terminal 121 of controlled rectifier 120 also by means of diode 158 and line 159.

The output windings 151d and 151e are connected across gate electrode terminal 133 and cathode electrode terminal 131 of controlled rectifier 130 by means of diode 161 and line 159, and diode 162 and line 163, respectively. The output windings 151f and 151g are connected across gate electrode terminal 143 and cathode electrode terminal 141 of controlled rectifier 140 through diode 164 and line 163, and diode 165 and line 166, respectively.

The output winding 151h is connected across gate electrode terminal 113 and cathode electrode terminal 111 of controlled rectifier 110 through diode 167 and line 166.

The output terminals 117 and 118 of Hall effect generator 114 are connected across the serially connected input windings 150a and 151a of transformers TA and TB. The input windings 150a–150h of each of transformers TA–TH are so connected that an output signal from terminals 117, 118; 127, 128; 137, 138; and 147, 148 of Hall effect generators 114, 124, 134, 144 induces magnetic flux of opposite polarities in the cores 154a–154h of transformers TA–TH, all respectively. From the foregoing description of the transformer connections, it may be seen that each Hall effect generator is operatively arranged to supply a gating pulse to two adjacent controlled rectifiers.

Control windings 152a and 152b of transformers TA and TB are connected in series and also in series with the control windings 152c–152h of the other transformers TC–TH respectively. The control windings of all transformers are connected across terminals 168 and 169.

Bias windings 153a and 153b of transformers TA and TB are electrically connected in series and in opposing magnetic polarity. All bias windings 153c 153d; 153e, 153f; and 153g, 153h of the other transformer pairs TC, TD; TE, TF; and TG, TH respectively, likewise connected to each other and all are connected in a series circuit across a unidirectional biasing source 170.

The function of the control windings is to control the direction of rotation of the motor shaft dependent on the direction of current $I_d$ through the control winding series circuit. The direction of this current flow may be determined by a bi-directional switch which is represented in block form as a bi-stable multivibrator 171 connected across terminals 168 and 169. Bi-stable multivibrators which operate in either one of two states of conduction until externally switched are well known in the art, and no further description is here deemed necessary. A current-limiting resistance 172 is provided in series with the output of multivibrator 170.

As illustrated in FIG. 6, the multivibrator 171 is arranged to receive a signal input from control signal source 173 over lines 174 and 175, the polarity of the input signal determining the stable state of the multivibrator, and hence the direction of current $I_d$ through the control windings 153a–153h. Where the motor also incorporates facility for speed regulation such as a regulator 109, which regulates the voltage applied to flux-producing windings 101–104, the input signal is applied to the regulator to control its voltage output responsive to the magnitude of the signal output of source 173. The regulator 109, represented in block form, is preferably of the time-ratio control type, as disclosed and claimed in the copending application of Raymond E. Morgan, Serial No. 833,282, filed August 12, 1959, and assigned to the same assignee as the present invention, which regulates an average voltage by controlling the time of conduction of a controlled rectifier device. If this type of regulator is used, a smoothing choke 176 and free-wheeling diode 177 are provided to sustain motor current $I_M$ during the non-conducting periods of the regulator 109.

The control signal source 173 may be of the character which compares a motor speed indicative voltage and a speed reference voltage and provides a resultant speed error signal which may be derived from a tachometer generator driven by the motor shaft, to a motor speed or voltage regulator. Such networks are well known to those skilled in the art and need not be here further discussed.

By way of exemplification only, such a speed-regulating system is described in the copending application of Carlton E. Graf, Serial No. 123,064, filed July 10, 1961, and assigned to the same assignee as the present invention.

Assume now that control signal source 173 provides a speed error signal of such polarity that multivibrator 171 furnishes a control current $I_d$ to the transformer control windings 152a–152h and of a given magnitude to cause regulator 109 to produce a regulated voltage across windings 101–104 and associated controlled rectifiers to thereby cause the motor to run at a regulated speed.

The cores 154a–154h of transformers TA–TH respectively are so magnetically biased by biasing source 170 with no control signal $I_d$ applied, that due to saturation thereof, pulses applied to the input windings 150a–150h can not be transmitted to the output windings 151a–151h. If a control current $I_d$ flows through the control windings in a given direction, four of the transformers, one of each pair TA, TB; TC, TD; TE, TF; TG, TH will remain saturated while four will be reset during interpulse periods by virtue of the ampere turns of the control windings.

The operation of the motor of FIG. 6 is now described. Pulse generator 160 is operative to apply repetitive pulse excitation currents to the series-connected Hall effect generators 114, 124, 134 and 144. The voltage magnitude of biasing source 170 is sufficient to saturate the cores 151a–151h of all of the transformers. In this condition, if a signal is generated in Hall generator 114 and applied across input windings 150a and 150b of transformers TA and TB, no signal will appear in output windings 151a or 151b, because cores 154a and 154b are saturated and the magnitude of the signal output from the Hall generator 114 is not sufficient to overcome the saturation in the cores caused by bias windings 153a and 153b. A unidirectional control signal of controllable polarity is applied between terminals 168 and 169, producing a unidirectional control current $I_d$ flow through control windings 152a–152g. If the polarity of the control signal is such that terminal 168 is positive with respect to terminal 169, the control current in windings 152a, 152c, 152e and 152g will be sufficient to overcome the bias in the cores 154a 154c, 154e and 154g of transformers TA, TC, TE and TG respectively, resulting from the current in the bias windings, thereby leaving the cores 154a, 154c, 154e and 154g in an unsaturated condition. However, the control current in windings 152b, 152d, 152f and 152h acts to drive cores 154b, 154d, 154f and 154h further into saturation, inasmuch as the current $I_d$ tries to establish a flux in the same direction in these cores as already established by biasing current $I_d$ from source 170. Thus, if a signal is generated in Hall generator 114 and applied to input windings 150a and 150b, an output signal will appear in only winding 151a. This output signal is applied through diode 155 to gating electrode 113 of controlled rectifier 110 to trigger rectifier 110 and thereby allow unidirectional current flow in winding 101, which may be traced from ground through rectifier 110 and winding 101 to the negative side of source 106. In a like manner, the control current unsaturates saturable transformers TC, TE and TG and any output signals which may be generated in Hall generators 124, 134 and 144 are connected to the gating electrodes of controlled rectifiers 120, 130 and 140 respectively. However, if a control signal of opposite polarity is applied to terminals 168 and 169 so that terminal 169 is positive with respect to terminal 168, then cores 154a, 154c, 154e and 154g of saturable transformers TA, TC, TE and TG are driven further into saturation and saturable transformers TB, TD, TF and TH are unsaturated. Under this condition, output signals from Hall generators 114, 124, 134 and 144 are applied to the gating electrodes of controlled rectifiers 120, 130, 140 and 110 respectively.

Thus, it is seen that if a control signal is applied to terminals 168 and 169 so that terminal 168 is positive with respect to 169, and rotor member 105 is in the position shown in FIG. 6, output signals are generated in Hall generators 114 and 124 and are applied to controlled rectifiers 110 and 120 respectively, thereby energizing flux-producing windings 101 and 102 and establishing armature field $F_{112}$, FIG. 7a. Referring now to FIG. 7a, therein is shown the angular relation between the rotor flux $\phi_R$ and the armature field $F_{112}$. As will be apparent, such an angular relation between armature field and rotor flux results in a clockwise torque on rotor member 105 and produces clockwise rotation of rotor member 105. In a manner as has been previously explained in conjunction with FIG. 1, this rotation of rotor member 105 will result in sequential energization of the coils 101, 102, 103 and 104, a clockwise driving torque on rotor member 105, and thus continuous clockwise rotation of rotor member 105.

However, if a control signal is applied to terminals 168 and 169 so that terminal 169 is positive with respect to 166 and the rotor member 105 is in the position shown in FIG. 6, signals generated in Hall generators 114 and 124 are applied to the gate electrode terminals 123, 133 of controlled rectifiers 120 and 130 respectively and cause a resultant armature field $F_{123}$. Referring now to FIG. 7b, therein is shown the angular relation between the rotor flux $\phi_R$ and resultant armature field $F_{123}$ when such a control signal is applied to terminals 169 and 168. Such an angular flux relation between armature field and rotor flux will result in a counterclockwise torque on rotor member 105 and produce rotation of rotor member 105 in a counterclockwise direction. In a manner similar to that previously described, a counterclockwise rotation of 90° of rotor member 105 from the position shown in FIG. 6 results in Hall generator 144 triggering controlled rectifier 110 into conduction, the extinguishing of controlled rectifier 130 and the establishment of resultant armature field $F_{123}$, so that the counterclockwise torque on rotor member 105 is maintained and rotor member 105 rotates continuously in a counterclockwise direction.

In the example shown in FIGS. 6 and 7, the Hall generators supply positive pulses to the gating electrodes of their respective controlled rectifiers upon the influence of a south magnetic pole, whereas, in the example of FIG. 1, the Hall generators supply positive pulses to the gating electrodes of the respective controlled rectifiers upon the influence of a north magnetic pole. The responsive polarity of the Hall generators may be controlled by controlling the polarity of the energizing pulses of current supplied to the input terminals of the Hall generators. It is apparent that by reversing the direction of the control current $I_d$ when the motor of FIG. 6 is operating in a given direction that a braking torque may be exerted on the motor shaft. It will be recognized by those versed in the art that this type of braking is not regenerative, but that braking energy is furnished from the D.C. power source.

In all the examples shown thus far, two adjacent motor windings are conducting unidirectional current at any given instant, with the two conducting windings being electrically connected in parallel. FIG. 8 shows another embodiment of the invention in which the two conducting windings are serially connected such that the same current flows in each winding. This circuit and operation thereof, using the same reference numerals as in FIG. 1, is as follows: Assuming the Hall generators to be connected in the manner as shown in FIG. 8, when the rotor member 5 is in the illustrated position, which is the same position as shown in FIG. 1, Hall generators 14 and 24 supply now gating pulses to controlled rectifiers 30 and 20 respectively, triggering these controlled rectifiers into conduction. Unidirectional current from source 6 flows through the series circuit comprising winding 2, controlled rectifier 20, winding 3 and controlled rectifier 30, thereby establishing a resultant armature field $F_{23}$, which exerts a clockwise torque on rotor member 5, thereby causing clockwise rotation of rotor member 5. When rotor member 5 has rotated through 90° clockwise, Hall generator 34 triggers controlled rectifier 10 into conduction, and commutating capacitor 7 extinguishes controlled rectifier 30. The series circuit now comprises the source 6, winding 2, controlled rectifier 20, winding 1 and controlled rectifier 10. The resultant armature field $F_{12}$ maintains the clockwise torque on rotor member 5. Thus, in a manner similar to that previously described, the windings 1, 2, 3 and 4 are sequentially energized so as to produce a clockwise driving torque on rotor member 5.

While the invention is thus described and a number of embodiments shown, the invention is not limited to these shown embodiments. Instead, many modifications will be obvious to those skilled in the art which lie within the spirit and scope of the invention. For example, the invention is not limited to use in a motor which has four motor windings. It may be used with any number of one or more windings, it being only necessary to provide a sufficient number of Hall generators or similar magnetic detectors to provide a distinct gating signal for each of the switching devices connected to the windings so as to sequentially or intermittently energize the windings and produce a driving torque on the rotor member. Also, the Hall generators can be positioned and the commutating capacitors so arranged that only one winding is conductive at any given instant. Moreover, a permanent magnet rotor member having more than two poles may be utilized.

Other embodiments and modifications of the disclosed invention may occur to those skilled in the art which do not depart from the spirit and scope of the invention. Accordingly, it is intended to cover all embodiments and modifications of the invention and changes in the illustrated embodiments thereof which do not depart from the spirit and scope of the invention.

What is claimed as new and is desired to secure by Letters Patent of the United States is:

1. An electric motor energizable from a source of unidirectional potential which comprises:
    (a) a rotor having magnetic poles of opposite polarity thereon;
    (b) a stator member, a plurality of flux-producing windings positioned in said stator member in torque-producing relation with said rotor;
    (c) a plurality of switching devices each having control means for rendering its associated switching device conductive, each of said switching devices controlling the connection of a respective one of said windings to a source of unidirectional potential so that unidirectional current will flow in each of said windings when its respective switching device is conducting;
    (d) a plurality of Hall effect generators positioned in flux-sensing relationship to said magnetic poles;
    (e) means for applying pulsed electric energy to said Hall effect generators; and
    (f) means connecting each of said Hall effect generators to the control means of a respective one of said switching devices whereby each of said Hall effect generators supplies a gating signal to the control means of said respective switching device to render said respective switching device conductive upon coincident interaction of a predetermined level of magnetic flux from said magnetic poles and applied electric energy within said Hall effect generator to sequentially energize said windings and produce a driving torque on said rotor.

2. The motor of claim 1 wherein said rotor is a permanent magnet rotor and said magnet poles are the poles of an auxiliary permanent magnet mounted on the rotor shaft, the poles of said permanent magnets having a predetermined alignment, said Hall effect generators being positioned about the poles of said auxiliary permanent magnet so as to sense the position of said rotor upon rotation thereof and cause sequential energization of said flux-producing windings.

3. An electric motor according to claim 1 in which more than one of said switching devices are conductive at a given time and in which the respective windings associated with the conducting switching devices are electrically connected in parallel.

4. An electric motor according to claim 1 in which more than one of said switching devices are conducting at a given time and in which the respective windings associated with the conducting switching devices are electrically connected in series.

5. The motor of claim 1 wherein said switching devices are solid state controlled rectifiers.

6. The motor of claim 1 wherein said means for applying electric energy to said Hall effect generators comprises a pulse relaxation oscillator.

7. An electric motor energizable from a source of unidirectional potential which comprises:
    (a) a rotor having magnetic poles of opposite polarity thereon;
    (b) a stator member, a plurality of flux-producing windings positioned in said stator member in torque-producing relation with said rotor;
    (c) a plurality of solid state switching devices each having control means for rendering its associated switching device conductive, each of said switching devices being connected in circuit with one of said windings to control the flow of current through a respective one of said windings from a source of unidirectional potential so that unidirectional current will flow in each of said windings when its respective switching device is conducting;
    (d) a plurality of Hall effect generators positioned in flux-sensing relationship to said magnetic poles;

(e) means for applying pulsed electric energy to said Hall effect generators; and (f) means connecting each of said Hall effect generators to the control means of a respective one of said switching devices whereby each of said Hall effect generators supplies a gating signal to the control means of a respective switching device to render said respective switching device conductive upon coincident interaction of a predetermined level of magnetic flux from said magnetic poles on said rotor and applied electric energy within said Hall effect generator to sequentially energize said windings and produce a driving torque on said rotor.

8. An electric motor energizable from a source of unidirectional potential which comprises, (a) a rotor having magnetic poles of opposite polarity thereon;

(b) a stator member, a plurality of flux-producing windings positioned in said stator member in torque-producing relation with said rotor;

(c) a plurality of switching devices each having control means for rendering its associated switching device conductive, each of said switching devices controlling the connection of a respective one of said windings to a source of unidirectional potential so that unidirectional current will flow in each of said windings when its respective switching device is conducting;

(d) a plurality of Hall effect generators each positioned to sense flux emanating from said magnetic poles at predetermined angular positions of said rotor;

(e) means for applying electric energy to said Hall effect generators;

(f) first controllable means connecting each of said Hall effect generators to the control means of a first one of said switching devices whereby each of said Hall effect generators supplies a gating signal to the control means of one of said first switching devices to render said first switching devices conductive upon coincident interaction of predetermined level of magnetic flux from magnetic poles on said rotor and applied electric energy within said Hall effect generator, whereby said windings are energized in a first predetermined sequence to produce a driving torque in a first direction on said rotor; and (g) second controllable means connecting each of said Hall effect generators to the control means of a second one of said switching devices whereby each of said Hall effect generators supplies a gating signal to the control means of one of said second switching devices to render said second switching devices conductive upon a coincident interaction of a predetermined level of magnetic flux from magnetic poles on said rotor and applied electric energy within said Hall effect generator, whereby said windings are energized in a second predetermined sequence to produce a driving torque in a second predetermined direction on said rotor.

9. The motor of claim 8 wherein said first and said second controllable means comprise first and second saturable core transformers.

10. The motor of claim 9 including means to cause saturation of the cores of either said first or said second transformers to thereby render either said first or said second transformers inoperative to transmit a signal from said Hall effect generators to thereby control direction of rotation of said rotor.

11. The motor of claim 8 wherein said switching devices are semiconductor controlled rectifiers.

12. An electric motor energizable from a source of unidirectional potential which comprises, (a) a rotor having magnetic poles of opposite polarity thereon;

(b) a stator member, a plurality of flux-producing windings positioned in said stator in torque-producing relation with said rotor when energized;

(c) a plurality of semi-conductive controlled rectifiers each having control means for rendering its associated rectifier conductive, each of said rectifiers controlling the connection of a respective one of said windings to a source of unidirectional potential so that unidirectional current will flow in each of said windings when its respective rectifier is conducting;

(d) a plurality of Hall effect generators each adapted to sense different angular positions of said rotor;

(e) means for applying pulses of electric energy to said Hall effect generators;

(f) first controllable means connecting each of said Hall effect generators to the control means of a first one of said rectifiers whereby each of said Hall effect generators supplies a gating pulse to control means of one of said first rectifiers to render said first rectifier conducting upon coincident interaction of magnetic flux from magnetic poles in said rotor and applied pulses of electric energy within said Hall effect generator;

(g) means responsive to the conduction of one of said first rectifiers for extinguishing a selected previously conducting rectifier, whereby said windings are energized in a first predetermined sequence to produce a driving torque in a first predetermined direction on said rotor;

(h) second controllable saturable transformer means connecting each of said Hall effect generators to the control means of a second one of said rectifiers whereby each of said Hall effect generators supplies a gating pulse to the control means of one of said second rectifiers to render said second rectifiers conductive upon coincident interaction of magnetic flux from magnetic poles on said rotor and applied pulses of electric energy within said Hall effect generator; and (i) means responsive to the conduction of one of said second rectifiers for extinguishing a selected previously conducting rectifier, whereby said windings are energized in a second predetermined sequence to produce a driving torque in a second predetermined direction on said rotor.

References Cited by the Examiner

UNITED STATES PATENTS

| | | | |
|---|---|---|---|
| 2,512,325 | 6/50 | Hansen | 310—72.1 |
| 2,814,008 | 11/57 | Staniloff | 318—328 |
| 2,995,690 | 8/61 | Lemon | 318—329 |
| 3,025,443 | 3/62 | Wilkinson et al. | 318—138 |

ORIS L. RADER, *Primary Examiner.*